(12) United States Patent
Hooker et al.

(10) Patent No.: US 8,108,621 B2
(45) Date of Patent: Jan. 31, 2012

(54) DATA CACHE WITH MODIFIED BIT ARRAY

(75) Inventors: Rodney E. Hooker, Austin, TX (US); Colin Eddy, Austin, TX (US); G. Glenn Henry, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 412 days.

(21) Appl. No.: 12/472,845

(22) Filed: May 27, 2009

(65) Prior Publication Data

US 2010/0306475 A1 Dec. 2, 2010

(51) Int. Cl.
*G06F 13/00* (2006.01)
(52) U.S. Cl. .. 711/141; 711/144; 711/146; 711/E12.017
(58) Field of Classification Search .............. 711/141, 711/144, 146, E12.017
See application file for complete search history.

(56) References Cited

U.S. PATENT DOCUMENTS

| | | | |
|---|---|---|---|
| 5,555,379 A * | 9/1996 | Silla | 711/3 |
| 6,412,051 B1 * | 6/2002 | Konigsburg et al. | 711/163 |
| 6,981,111 B1 * | 12/2005 | Porat et al. | 711/154 |
| 7,236,421 B1 * | 6/2007 | Eldridge et al. | 365/230.03 |
| 2002/0056022 A1 | 5/2002 | Leung | |
| 2006/0190676 A1 | 8/2006 | Butler et al. | |

\* cited by examiner

*Primary Examiner* — Connie Yoha
(74) *Attorney, Agent, or Firm* — E. Alan Davis; James Huffman

(57) ABSTRACT

A cache memory system includes a first array of storage elements each configured to store a cache line, a second array of storage elements corresponding to the first array of storage elements each configured to store a first partial status of the cache line in the corresponding storage element of the first array, and a third array of storage elements corresponding to the first array of storage elements each configured to store a second partial status of the cache line in the corresponding storage element of the first array. The second partial status indicates whether or not the cache line has been modified. When the cache memory system modifies the cache line within a storage element of the first array, it writes only the second partial status in the corresponding storage element of the third array to indicate that the cache line has been modified but refrains from writing the first partial status in the corresponding storage element of the second array. The cache memory system reads both the first partial status and the second partial status to determine the full status.

39 Claims, 13 Drawing Sheets

Fig. 3a

Table 1

| partial MESI status | modified bit | full MESI status |
|---|---|---|
| Modified | Don't Care | Modified |
| Exclusive | Set | Modified |
| Exclusive | Reset | Exclusive |
| Shared | Set | Modified |
| Shared | Reset | Shared |
| Invalid | Don't Care | Invalid |

Fig. 3b (Alternate Embodiment)

Table 2

| partial MESI status | modified bit | full MESI status |
|---|---|---|
| Modified | Don't Care | Modified |
| Exclusive | Set | Modified |
| Exclusive | Reset | Exclusive |
| Shared | Don't Care | Shared |
| Invalid | Don't Care | Invalid |

DATA CACHE WITH MODIFIED BIT ARRAY

CROSS REFERENCE TO RELATED APPLICATIONS

This application is related to co-pending U.S. patent application Ser. No. 12/472,766, entitled DATA CACHE WITH MODIFIED BIT ARRAY, which is concurrently filed herewith, and which has a common assignee and common inventors, and which is incorporated by reference herein for all purposes.

FIELD OF THE INVENTION

The present invention relates in general to cache memories in microprocessors, and more particularly to cache line coherence status organization therein.

BACKGROUND OF THE INVENTION

Modern microprocessors include cache memories for reducing the latency associated with memory access instructions. The cache memory typically includes a data array that stores the actual cache lines of data and a tag array that stores the address tags associated with the cache lines in the data array. Each entry of the tag array also includes storage for a status of the cache line. The cache line status indicates, among other things, whether the corresponding cache line in the data array is valid and whether it has been modified since being allocated.

Additionally, modern microprocessors, particularly superscalar microprocessors, include multiple functional units that require access to the cache memory, such as distinct load and store units. The cache memory data and tag arrays typically have multiple ports so that each functional unit can access the arrays simultaneously to optimize performance. However, adding multiple ports to the arrays may significantly increase their size and power consumption. Furthermore, because the size of these arrays is often already relatively large, making them even bigger may make the task of floor-planning the microprocessor to include them even more difficult.

One solution to this problem is to replicate the tag arrays so that each functional unit has its own tag array, which allows the tag arrays to be single-ported. Although this solution may require more space on the microprocessor in the aggregate, because each tag array is smaller, it eases floor-planning, and may additionally facilitate power management because each tag array is separately power-manageable. However, a problem with having replicated tag arrays is that when the tag and/or status of a cache line needs to be updated, all the tag arrays are accessed to update the status in each of them. This consumes precious access bandwidth to the tag arrays and requires all the tag arrays to consume power during the updates.

Therefore, what is needed is a cache memory organization scheme that addresses these problems.

BRIEF SUMMARY OF INVENTION

In one aspect, the present invention provides a cache memory system. The cache memory system includes a first array of storage elements, each configured to store a cache line. The cache memory system also includes a second array of storage elements corresponding to the first array of storage elements, each configured to store a first partial status of the cache line in the corresponding storage element of the first array. The cache memory system also includes a third array of storage elements corresponding to the first array of storage elements, each configured to store a second partial status of the cache line in the corresponding storage element of the first array. The second partial status indicates whether or not the cache line has been modified. When the cache memory system modifies the cache line within a storage element of the first array, the cache memory system writes only the second partial status in the corresponding storage element of the third array to indicate that the cache line has been modified but refrains from writing the first partial status in the corresponding storage element of the second array. The cache memory system reads both the first partial status and the second partial status of the cache line from corresponding storage elements of the second array and the third array, respectively, to determine the full status of the cache line.

In another aspect, the present invention provides a method for accessing a cache memory system. The method includes storing a cache line in each storage element of a first array of storage elements. The method also includes storing into each storage element of a second array of storage elements corresponding to the first array of storage elements a first partial status of the cache line in the corresponding storage element of the first array. The method also includes storing into each storage element of a third array of storage elements corresponding to the first array of storage elements a second partial status of the cache line in the corresponding storage element of the first array, wherein the second partial status indicates whether or not the cache line has been modified. The method also includes, in response to modifying the cache line within a storage element of the first array, writing only the second partial status in the corresponding storage element of the third array to indicate that the cache line has been modified, but refraining from writing the first partial status in the corresponding storage element of the second array. The method also includes determining the full status of the cache line by reading both the first partial status and the second partial status of the cache line from corresponding storage elements of the second array and the third array, respectively.

In another aspect, the present invention provides a computer program product for use with a computing device, the computer program product including a computer usable storage medium, having computer readable program code embodied in the medium, for specifying cache memory system. The computer readable program code includes first program code for specifying a first array of storage elements, each configured to store a cache line. The computer readable program code also includes second program code for specifying a second array of storage elements corresponding to the first array of storage elements, each configured to store a first partial status of the cache line in the corresponding storage element of the first array. The computer readable program code also includes third program code for specifying a third array of storage elements corresponding to the first array of storage elements, each configured to store a second partial status of the cache line in the corresponding storage element of the first array. The second partial status indicates whether or not the cache line has been modified. When the cache memory system modifies the cache line within a storage element of the first array, the cache memory system writes only the second partial status in the corresponding storage element of the third array to indicate that the cache line has been modified but refrains from writing the first partial status in the corresponding storage element of the second array. The cache memory system reads both the first partial status and the second partial status of the cache line from corresponding storage elements of the second array and the third array, respectively, to determine the full status of the cache line.

An advantage of the present invention is that when a cache line is modified requiring its status to be updated accordingly, the presence of the modified bit array alleviates the need to access the tag array(s) to update the cache line status, thereby reducing traffic to the tag array. Additionally, in embodiments with multiple tag arrays, the presence of the modified bit array simplifies the floor-planning of the tag arrays into the microprocessor and enables better power management of them without requiring the additional bandwidth consumption problems discussed above.

BRIEF DESCRIPTION OF THE DRAWINGS

FIG. 3a is a Table illustrating a schema used by the data cache of FIG. 1 for computing a full MESI cache line status from a partial MESI cache line status and a modified bit according to the present invention.

FIG. 3b is a Table illustrating a schema used by the data cache of FIG. 1 for computing a full MESI cache line status from a partial MESI cache line status and a modified bit according to an alternate embodiment of the present invention.

DETAILED DESCRIPTION OF THE INVENTION

Figure 1:
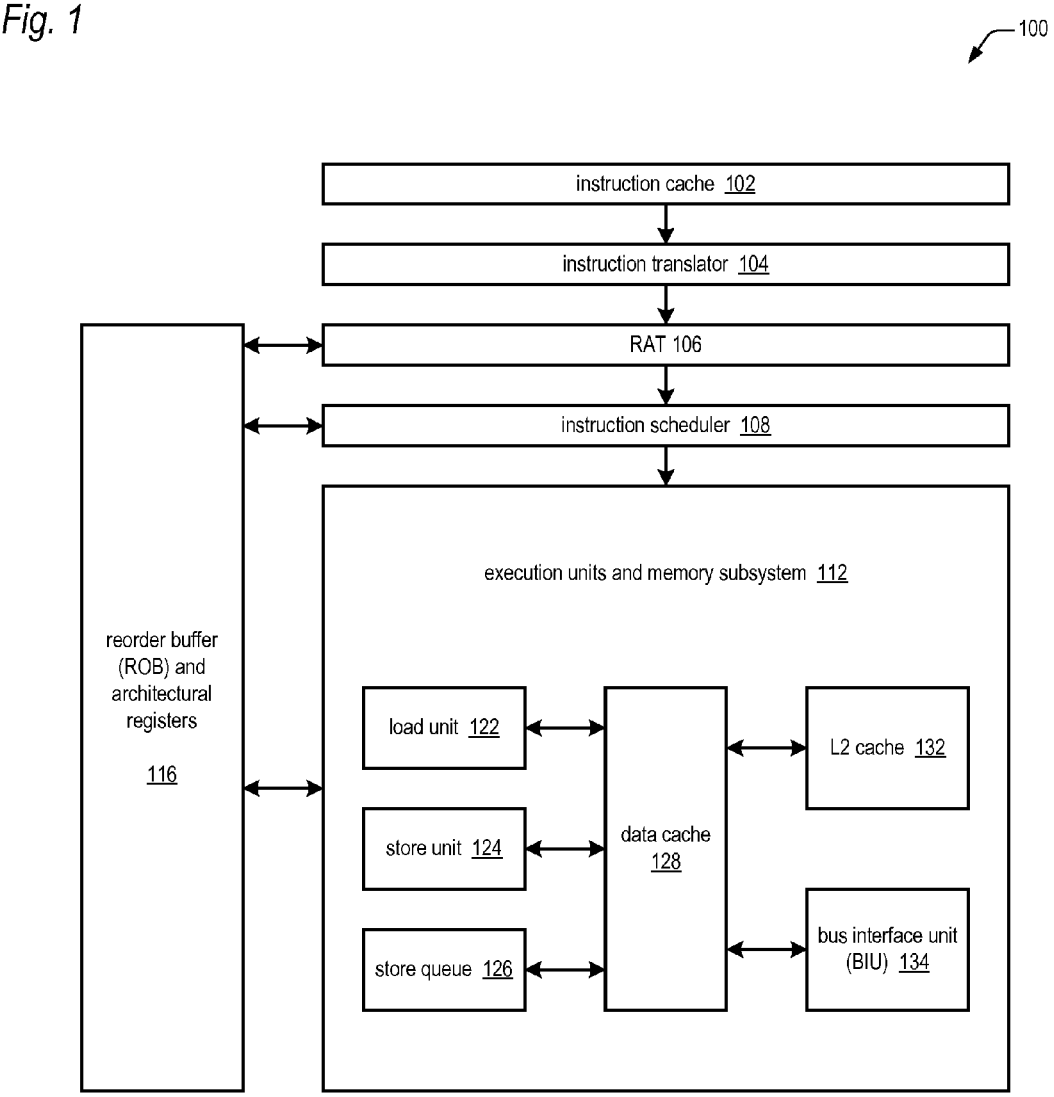
FIG. 1 is a block diagram illustrating a microprocessor according to the present invention.

Referring now to FIG. 1, a block diagram illustrating a microprocessor 100 according to the present invention is shown. The microprocessor includes an instruction cache 106 that caches program instructions fetched and executed by the microprocessor 100 from a system memory (not shown). The program instructions may include instructions that access memory, such as x86 MOV, PUSH, or POP instructions for example, or that cause the microprocessor 100 to access memory, such as to perform a page table walk in response to a translation lookaside buffer (TLB) miss.

The microprocessor 100 also includes an instruction translator 104 that receives instructions from the instruction cache 102 and translates the instructions (also referred to as macroinstructions) into one or more microinstructions, or micro-operations, that are simpler instructions actually executed by execution units and memory subsystem 112 of the microprocessor 100. In particular, the microinstructions may include load and store microinstructions, or simply load and store instructions. A load instruction loads the contents of a memory location into an architectural register 116 of the microprocessor 100. A store instruction stores the contents of an architectural register 116 of the microprocessor 100 to a memory location. In other embodiments, the load and store instructions are part of the native instruction set of the microprocessor 100.

The microprocessor 100 also includes a register alias table (RAT) 106 that receives instructions from the instruction translator 104. The RAT 106 receives the translated instructions from the instruction translator 104 in program order and determines the dependencies of each instruction on other unretired instructions in the microprocessor 100. The RAT 106 stores register renaming information associated with each unretired instruction in the microprocessor 100. The register renaming information incorporates the program order of the instructions, which is used by a reorder buffer (ROB) 116 to retire the instructions in program order. The RAT 106 allocates an entry in the ROB 116 for each instruction before dispatching it to the instruction scheduler 108. The instruction scheduler 108 receives instructions from the RAT 106 and issues the instructions to the execution units and memory subsystem 112 as their source operands become available based on the dependency information generated by the RAT 106 and as the execution units and memory subsystem 112 become available. In one embodiment, the microprocessor 100 is an out-of-order execution microprocessor. The ROB 116 is coupled to the RAT 106, the instruction scheduler 108, and the execution units and memory subsystem 112.

The execution units and memory subsystem 112 include a data cache 128 and a load unit 122, a store unit 124, a store queue 126, a level-2 (L2) cache 132, and a bus interface unit (BIU) 134, all coupled to the data cache 128. The load unit 122, store unit 124, and store queue 126 are also referred to herein as functional units. The load unit 122 executes load instructions to load data from the data cache 128 to the architectural registers 116. The store unit 124 and store queue 126 execute store instructions to store data from the architectural registers 116 to data cache 128. The bus interface unit 134 interfaces the microprocessor 100 to the microprocessor 100 bus, by which the microprocessor 100 transfers data with memory and peripheral devices. Furthermore, the bus interface unit 134 snoops the microprocessor 100 bus and responsively generates snoop operations to the data cache 128. Additionally, cache lines are evicted from the data cache 128 to the L2 cache 132. In one embodiment, the load unit 122, store unit 124, and store queue 126 are pipelines of multiple stages due to the fact that the various arrays of the data cache 128 (212/214/216/218 of FIG. 2) require multiple clock cycles to access. The organization of the data cache 128 and its interaction with the load unit 122, store unit 124, store queue 126, L2 cache 132, and a bus interface unit 134 are described in more detail below.

In one embodiment, the macroarchitecture of the microprocessor 100 is an IA-32 macroarchitecture (also referred to as the x86 architecture). A microprocessor has an IA-32 macroarchitecture if it can correctly execute a majority of the application programs that are designed to be executed on an IA-32 microprocessor. An application program is correctly executed if its expected results are obtained. However, other embodiments are contemplated in which the macroarchitecture of the microprocessor is other than the x86 macroarchitecture, yet still incorporates a data cache 128 with a modified bit array 216 (of FIG. 2) in order to realize the benefits thereof.

Figure 2:
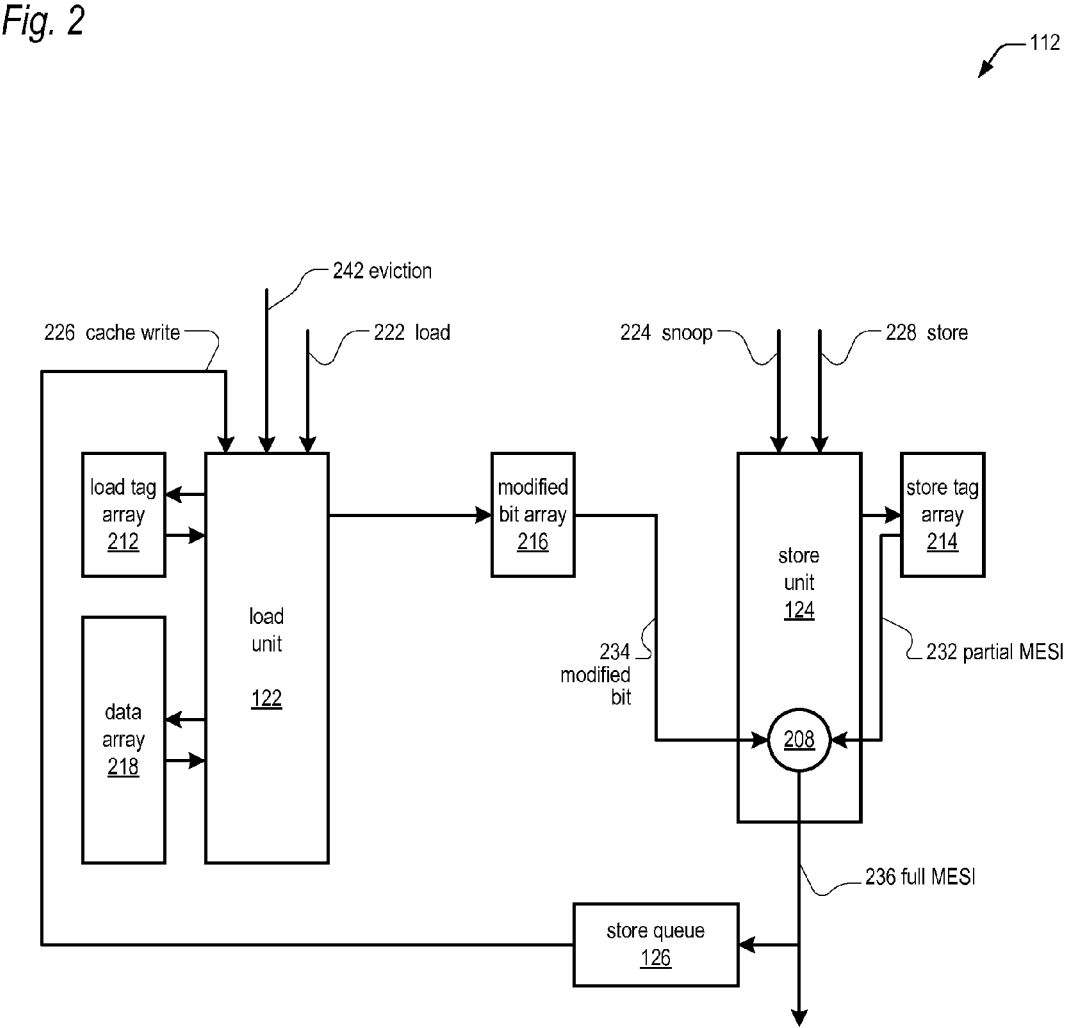
FIG. 2 is a block diagram illustrating a portion of the execution units and memory subsystem of the microprocessor of FIG. 1 according to the present invention.

Referring now to FIG. 2, a block diagram illustrating a portion of the execution units and memory subsystem 112 of the microprocessor 100 of FIG. 1 according to the present invention is shown. The load unit 122, store unit 124, and store queue 126 of the execution units and memory subsystem 112 of FIG. 1 are shown in FIG. 2. Additionally, elements of the data cache 128 of FIG. 1 are shown, namely, a load tag array 212, a store tag array 214, a modified bit array 216, and a data array 218. In the embodiment of FIG. 2, the load tag array 212 includes a single read/write port that is coupled to the load unit 122; the data array 218 includes a single read/write port that is coupled to the load unit 122; the store tag array 214 includes a single read/write port that is coupled to the store unit 124; and the modified bit array 216 includes a write port that is coupled to the load unit 122 and a read port that is coupled to the store unit 124. In one embodiment, the modified bit array 216 is a write-through array, i.e., if in a given clock cycle the store unit 124 reads the same location within the modified bit array 216 that the load unit 122 is writing, then the modified bit array 216 provides the newly written value to the store unit 124. In another embodiment, the data cache 128 includes collision detection and recovery logic that detects such a collision and provides the newly written value in a subsequent clock cycle. The store queue 126 generates a cache write operation 226 that is provided to the load unit 122 in the embodiment of FIG. 2 since the load unit 122 has the single read/write port to the data array 218.

The load tag array 212, store tag array 214 and modified bit array 216 are organized in the same fashion as the data array 218. For example, in one embodiment, the data array 218, load tag array 212, store tag array 214, and modified bit array 216 are each a 4-way set associative memory array that is indexed by an index portion (lower address bits) of a load, store, snoop or eviction address that selects a set, or row, of the data array 218, in which each set has 4 ways. Each way, or entry, in the selected set of the data array 218 stores a cache line. Each way, or entry, in the selected set of the load tag array 212 and store tag array 214 stores an address tag and status of the corresponding cache line in the data array 218. Each way, or entry, in the selected set of the modified bit array 216 stores a modified bit that indicates whether the corresponding cache line in the data array 218 has been modified. In one embodiment, the cache status is one of four possible status values, namely Modified, Exclusive, Shared or Invalid (MESI) according to the well-known MESI cache coherency protocol; however, other embodiments are contemplated in which the modified bit array 216 is used to store an indication that the corresponding cache line has been modified and in which the modified bit may be used to calculate the full cache line status of other cache coherency protocol schemes. When the data cache 128 allocates a cache line into the data array 218, it also writes the full MESI status of the cache line into both the load tag array 212 and the store tag array 214 and, in one embodiment, clears the corresponding modified bit in the modified bit array 216. In another embodiment, the data cache 128 clears the corresponding modified bit in the modified bit array 216 when it invalidates the cache line.

In the embodiment of FIG. 2, in addition to the cache write operations 226, the load unit 122 also handles load operations 222 and eviction operations 242 since these operations must access the data array 218, and the load unit 122 is the only unit coupled to the single read/write port of the data array 218. In the embodiment of FIG. 2, the store unit 124 handles store operations 228 and snoop operations 224, as described in more detail below with respect to FIGS. 4 and 5, respectively.

In the embodiment of FIG. 2, the data cache 128 always updates the load tag array 212 to reflect the full status of the corresponding cache line in the data array 218. However, the data cache 128 does not always update the store tag array 214 to reflect the full status of the corresponding cache line in the data array 218. Specifically, when the store queue 126 generates a cache write operation 226 to update a cache line, the store tag array 214 is not updated to reflect the new MESI status of the cache line. Instead, the load unit 122 sets the corresponding modified bit in the modified bit array 216; hence, the store tag array 214 is storing only a partial MESI status of the cache line, and the modified bit array 216 is storing an indication that the cache line has been modified. Subsequently, when the store unit 124 needs to know the full MESI status of the cache line, the store unit 124 reads both the modified bit 234 of the cache line from the modified bit array 216 and the partial MESI status 232 of the cache line from the store tag array 214, and combinatorial logic 208 of the store unit 124 computes the full MESI status 236 of the cache line (which is also provided to the store queue 126) using one of the schema shown in either Table 1 of FIG. 3a or Table 2 of FIG. 3b, which are described below.

Referring now to FIG. 3a, a Table 1 illustrating a schema used by the data cache 128 of FIG. 1 for computing a full MESI cache line status from a partial MESI cache line status and a modified bit according to the present invention is shown.

Table 1 includes three columns. The first column specifies a partial MESI status of the corresponding cache line in the data array 218, such as the partial MESI status 232 read from the store tag array 214 of FIG. 2. The second column specifies a modified bit of the corresponding cache line in the data array 218, such as the modified bit 234 read from the modified bit array 216 of FIG. 2. The third column specifies the full MESI state of the corresponding cache line in the data array 218, such as the full MESI state 236 generated by the combinatorial logic 208 of FIG. 2.

In the first row, Table 1 illustrates that if the partial MESI status is Modified, the computed full MESI status is also Modified, regardless of the value of the modified bit. In the second row, Table 1 illustrates that if the partial MESI status is Exclusive and the modified bit is set, the computed full MESI status is Modified. In the third row, Table 1 illustrates that if the partial MESI status is Exclusive and the modified bit is reset, the computed full MESI status is Exclusive. In the fourth row, Table 1 illustrates that if the partial MESI status is Shared and the modified bit is set, the computed full MESI status is Modified. This condition indicates the cache line is in the process of being upgraded to Exclusive status and an early store merge occurred. The embodiment of FIG. 3a takes advantage of this condition and upgrades the cache line status to Modified. In the fifth row, Table 1 illustrates that if the partial MESI status is Shared and the modified bit is reset, the computed full MESI status is Shared. In the sixth row, Table 1 illustrates that if the partial MESI status is Invalid, the computed full MESI status is Invalid, regardless of the value of the modified bit.

Referring now to FIG. 3b, a Table 2 illustrating a schema used by the data cache 128 of FIG. 1 for computing a full MESI cache line status from a partial MESI cache line status and a modified bit according to an alternate embodiment of the present invention is shown. Table 2 is similar to Table 1 of FIG. 3a; however in Table 2, if the partial MESI status is Shared, the computed full MESI status is Shared, regardless of the value of the modified bit.

Figure 4:
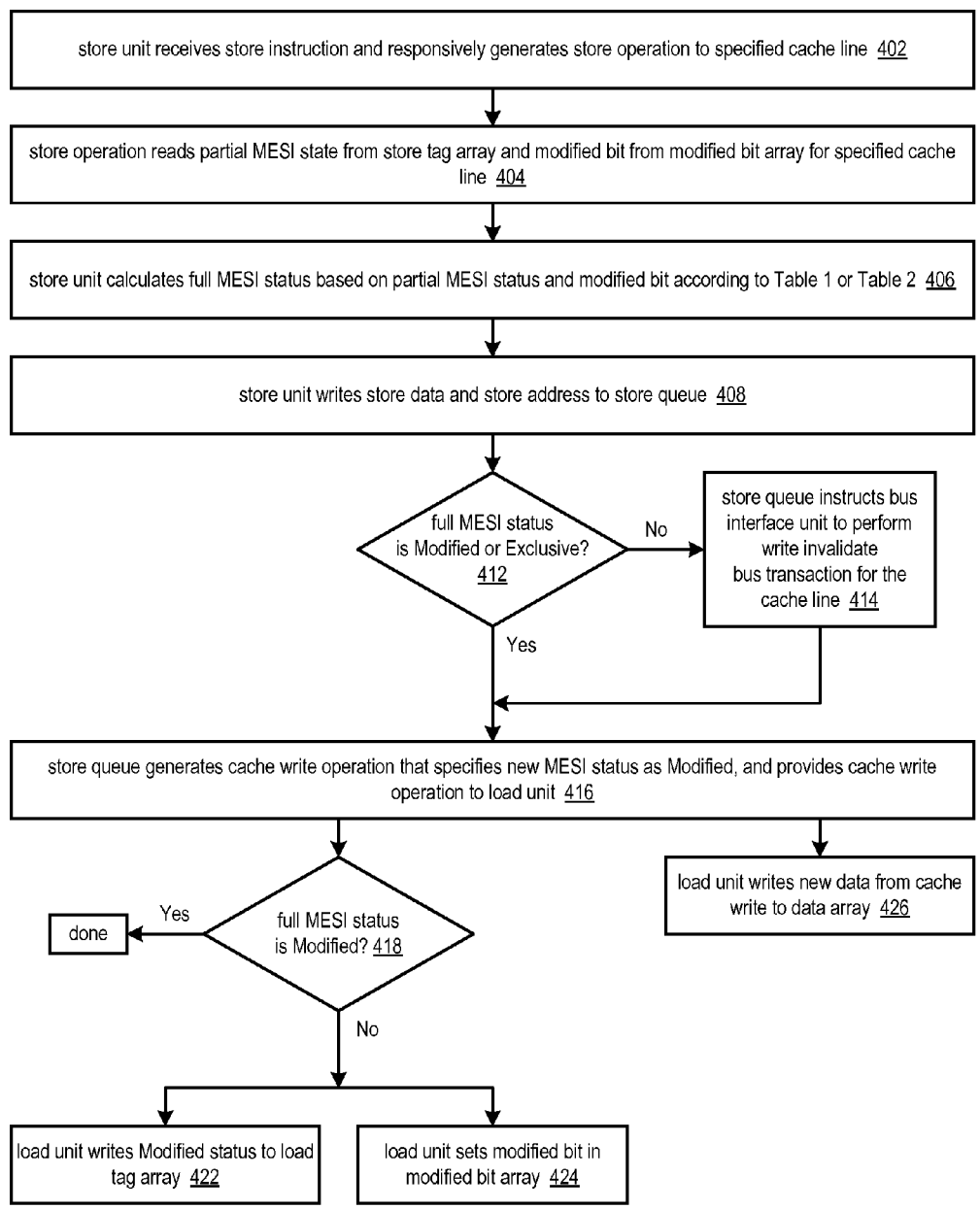
FIG. 4 is a flowchart illustrating operation of the microprocessor of FIG. 1 having the embodiment of the execution units and memory subsystem of FIG. 2 to execute a store instruction according to the present invention.

Referring now to FIG. 4, a flowchart illustrating operation of the microprocessor 100 of FIG. 1 having the embodiment of the execution units and memory subsystem 112 of FIG. 2 to execute a store instruction according to the present invention is shown. Flow begins at block 402.

At block 402, the store unit 124 receives a store instruction 228. In response, the store unit 124 generates a store query operation to the cache line implicated by the store address. Flow proceeds to block 404.

At block 404, the store query operation reads the partial MESI status 232 from the store tag array 214 and reads the modified bit 234 from the modified bit array 216 of FIG. 2 for the corresponding cache line implicated by the store address. Flow proceeds to block 406.

At block 406, the combinatorial logic 208 of the store unit 124 calculates the full MESI status 236 of the cache line according to either Table 1 of FIG. 3a or Table 2 of FIG. 3b. Flow proceeds to block 408.

At block 408, the store unit 124 allocates an entry in the store queue 126 and writes the store data and store address specified by the store instruction 228 to the allocated entry. Flow proceeds to decision block 412.

At decision block 412, the store queue 126 determines whether the full MESI status 236 calculated at block 406 is either Modified or Exclusive. If the full MESI status 236 calculated at block 406 is either Modified or Exclusive, flow proceeds to block 416; otherwise, flow proceeds to block 414.

At block 414, the store queue 126 instructs the bus interface unit 134 to perform a write invalidate bus transaction to invalidate the cache line in other caches that may have a copy of the cache line and to gain exclusive ownership of the cache line. Responsively, the data cache 128 upgrades the MESI status in the load tag array 212 and store tag array 214 to Exclusive. Flow proceeds to block 414.

At block 416, the store queue 126 generates a cache write operation 226 that specifies the new MESI status as Modified and provides the cache write operation 226 to the load unit 122. Flow proceeds concurrently to block 426 and to decision block 418.

At decision block 418, the load unit 122 determines whether the full MESI status 236 calculated at block 406 is Modified. If the full MESI status 236 calculated at block 406 is Modified, flow ends; otherwise, flow proceeds concurrently to blocks 422 and 424.

At block 422, the load unit 122 writes the Modified status to the entry of the load tag array 212 corresponding to the cache line implicated by the store address. Flow ends at block 422.

At block 424, the load unit 122 sets the modified bit in the entry of the modified bit array 216 corresponding to the cache line implicated by the store address. Advantageously, this will subsequently enable the store unit 124 to calculate the full MESI status 236 of the corresponding cache line in the data array 218 even though the store tag array 214 does not currently hold the full MESI status of the cache line, i.e., the partial MESI status 232 is not Modified. Flow ends at block 424.

As may be observed from the flowchart of FIG. 4, when the data cache 128 performs a cache write operation 226, which modifies a cache line in the data array 218, the data cache 128 updates the load tag array 212 with the new status of Modified (unless the status was already Modified, as shown with respect to blocks 418, 422 and 424 of FIG. 4) and sets the corresponding modified bit in the modified bit array 216; however, the data cache 128 does not update the store tag array 214 with the new status of Modified, which is advantageous as described herein. Nevertheless, the store unit 124 may calculate the full MESI status 236 of the cache line, as described with respect to block 406 of FIG. 4 (or block 506 of FIG. 5), by accessing both the store tag array 214 and the modified bit array 216, as described with respect to block 404 of FIG. 4 (or block 504 of FIG. 5).

Figure 5:
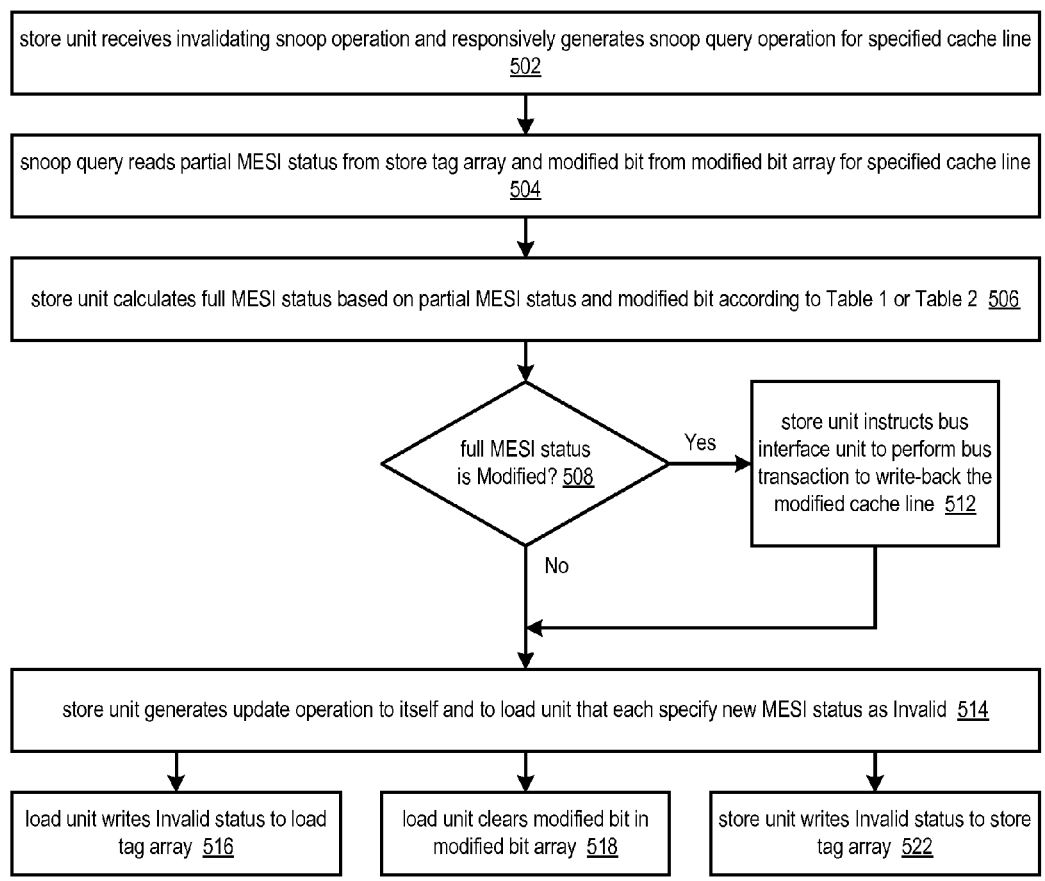
FIG. 5 is a flowchart illustrating operation of the microprocessor of FIG. 1 having the embodiment of the execution units and memory subsystem of FIG. 2 to execute an invalidating snoop request according to the present invention.

Referring now to FIG. 5, a flowchart illustrating operation of the microprocessor 100 of FIG. 1 having the embodiment of the execution units and memory subsystem 112 of FIG. 2 to execute an invalidating snoop request according to the present invention is shown. Flow begins at block 502.

At block 502, the store unit 124 receives an invalidating snoop request 224. In response, the store unit 124 generates a snoop query operation to itself to the cache line implicated by the snoop address. Flow proceeds to block 504.

At block 504, the snoop query operation reads the partial MESI status 232 from the store tag array 214 and reads the modified bit 234 from the modified bit array 216 of FIG. 2 for the corresponding cache line implicated by the snoop address. Flow proceeds to block 506.

At block 506, the combinatorial logic 208 of the store unit 124 calculates the full MESI status 236 of the cache line according to either Table 1 of FIG. 3a or Table 2 of FIG. 3b. Flow proceeds to decision block 508.

At decision block 508, the store unit 124 determines whether the full MESI status 236 calculated at block 506 is Modified. If so, flow proceeds to block 512; otherwise, flow proceeds to block 514.

At block 512, the store unit 124 instructs the bus interface unit 134 to perform a bus transaction to write back the modified cache line to system memory. Flow proceeds to block 514.

At block 514, the store unit 124 generates a status update operation to itself and a status update operation to the load unit 122 that each specify the new MESI status as Invalid. Flow proceeds concurrently to blocks 516, 518, and 522.

At block 516, the load unit 122 writes the Invalid status to the entry of the load tag array 212 corresponding to the cache line implicated by the snoop address. Flow ends at block 516.

At block 518, the load unit 122 clears the modified bit in the entry of the modified bit array 216 corresponding to the cache line implicated by the snoop address. In one embodiment, the data cache 128 does not reset the modified bit in the modified bit array 216 when the data array 218 entry is invalidated, but instead waits to reset the modified bit until the corresponding cache line is allocated into the data array 218. Flow ends at block 518.

At block 522, the store unit 124 writes the Invalid status to the entry of the store tag array 214 corresponding to the cache line implicated by the snoop address. Flow ends at block 522.

In the embodiment of FIG. 2, snoop query operations are handled by the store unit 124 pipeline because the store unit 124 pipeline tends not to be as full as the load unit 122 pipeline. However, an alternate embodiment is contemplated in which snoop query operations are handled by the load unit 122 rather than the store unit 124 since the load tag array 212 also provides the full MESI status of the cache line.

Load operations 222 and eviction operations 242 are handled by the load unit 122 in the embodiment of FIG. 2 (as well as the embodiments of FIGS. 6, 9, and 12) because the load unit 122 has access to the single read port of the data array 218. Load operations 222 only need to know whether the load address hits in the data cache 128, i.e., whether the cache line implicated by the load address is present in the data cache 128. (The load address hits in the data cache 128 if the tag portion of the load address matches a valid tag in a set of the load tag array 212 that is indexed by the index portion of the load address.) However, evictions 242 (and snoop queries) need to know the full MESI status of the cache line. Evictions 242 receive the full MESI status from the load tag array 212 in the embodiment of FIG. 2.

Furthermore, minimally a store operation only needs to know whether the status of the specified cache line is at least Exclusive (i.e., Exclusive or Modified in the MESI embodiment) so that it can know whether it can write to the cache line immediately, or whether it has to first gain exclusive ownership of the cache line at block 414. However, the embodiment of FIG. 4 includes an optimization at decision block 418 in which the store unit 124 foregoes updating the load tag array 212 and modified bit array 216 if the status of the specified cache line is already Modified and the modified bit in the modified bit array 216 is set, which may advantageously consume less power.

Generally speaking, the modified bit array 216 need only be read for operations that need to know the full MESI status of the cache line. Thus, the modified bit array 216 needs to be read by any unit (i.e., the load unit 122 or the store unit 124) that satisfies both the following conditions: (1) it does not update its tag array 212/214 on cache writes, and (2) it services eviction or snoop query operations (or store query operations that include the optimization included in the embodiments of FIGS. 4 and 7).

Figure 6:
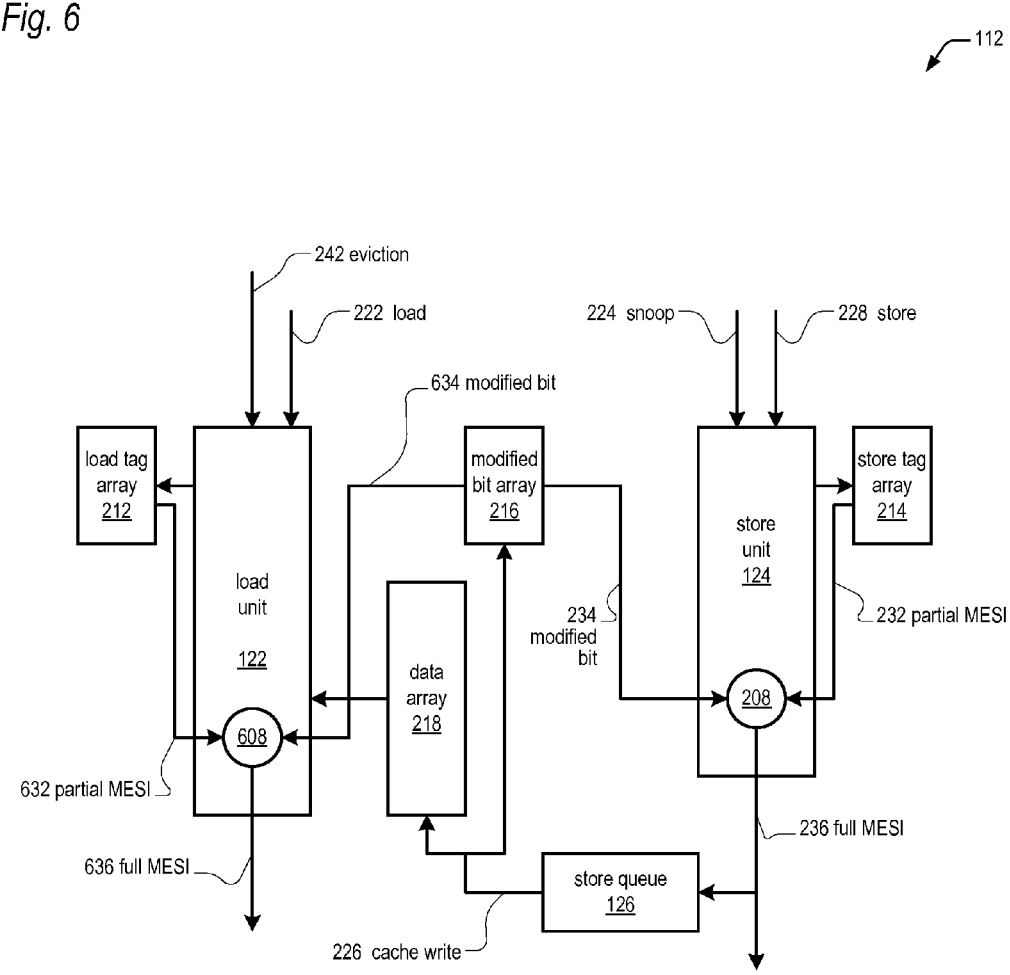
FIG. 6 is a block diagram illustrating a portion of the execution units and memory subsystem of the microprocessor of FIG. 1 according to an alternate embodiment of the present invention.

Referring now to FIG. 6, a block diagram illustrating a portion of the execution units and memory subsystem 112 of the microprocessor 100 of FIG. 1 according to an alternate embodiment of the present invention is shown. The embodiment of FIG. 6 is similar to the embodiment of FIG. 2 in many ways and like-numbered elements are similar. Differences are now described.

In the embodiment of FIG. 6, the modified bit array 216 has two read ports, one that provides a modified bit 234 to the store unit 124 and another that provides a modified bit 634 to the load unit 122. Additionally, the write port of the modified bit array 216 is coupled to the store queue 126 to enable the store queue 126 to update the modified bit array 216 on a cache write operation 226.

In the embodiment of FIG. 6, the load unit 122 also includes combinatorial logic 608 that receives partial MESI status 632 from the load tag array 212 and receives the modified bit 634 from the second read port of the modified bit array 216 and calculates a full MESI status 636 using one of the schema shown in either Table 1 of FIG. 3*a* or Table 2 of FIG. 3*b*.

In the embodiment of FIG. 6, the data array 218 includes a read port coupled to the load unit 122 and a write port coupled to the store queue 126 that enables the store queue 126 to perform cache write operations 226 to the data array 218. That is, the store queue 126 performs a cache write operation 226 directly to the data array 218 and modified bit array 216, rather than sending it to the load unit 122 as in FIG. 2. Thus, neither the load tag array 212 nor the store tag array 214 gets updated with the new status of Modified by a cache write operation 226; rather, the cache write operation 226 only sets the corresponding modified bit in the modified bit array 216.

Figure 7:
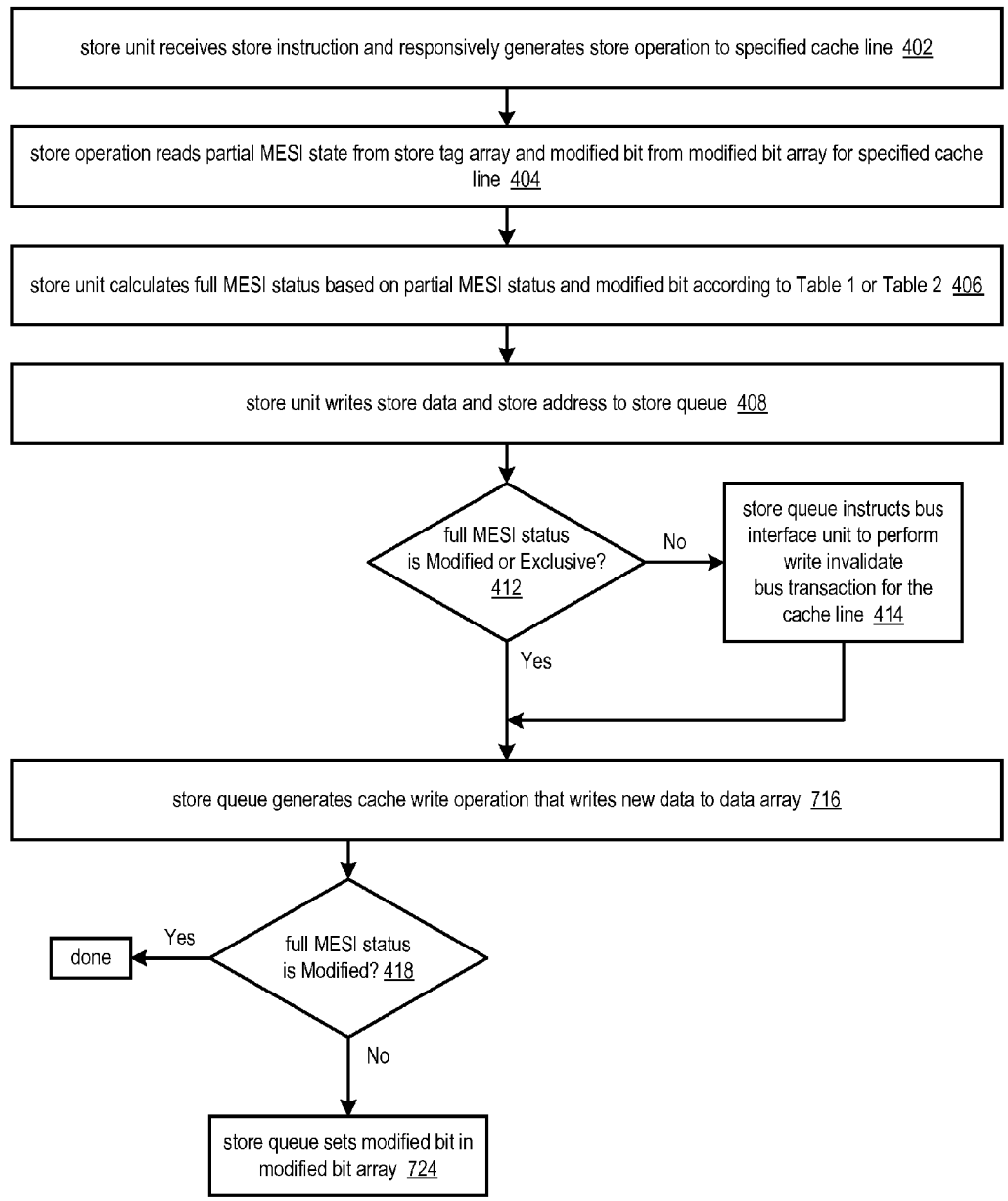
FIG. 7 is a flowchart illustrating operation of the microprocessor of FIG. 1 having the embodiment of the execution units and memory subsystem of FIG. 6 to execute a store instruction according to the present invention.

Referring now to FIG. 7, a flowchart illustrating operation of the microprocessor 100 of FIG. 1 having the embodiment of the execution units and memory subsystem 112 of FIG. 6 to execute a store instruction according to the present invention is shown. The flowchart of FIG. 7 is similar to the flowchart of FIG. 4. However, block 416 of FIG. 4 is replaced with block 716 in FIG. 7 in which the store queue 126 generates the cache write operation 226 operation directly to the data array 218 to write the store data therein. Additionally, the flowchart of FIG. 7 does not include a block 426 of FIG. 4 since the data array 218 is written directly at block 716. Furthermore, the flowchart of FIG. 7 does not include a block 422 of FIG. 4 since the store queue 126 does not update the load tag array 212 (nor the store tag array 214) with the new Modified cache line status. Finally, block 424 of FIG. 4 is replaced with block 724 in FIG. 7 in which the store queue 126 generates the cache write operation 226 operation directly to the modified bit array 216 to set the corresponding modified bit therein, if the full MESI status is not already Modified as determined at decision block 418.

The operation of the microprocessor 100 of FIG. 1 having the embodiment of the execution units and memory subsystem 112 of FIG. 6 to execute an invalidating snoop request according to the present invention is similar to the operation shown in FIG. 5.

Figure 8:
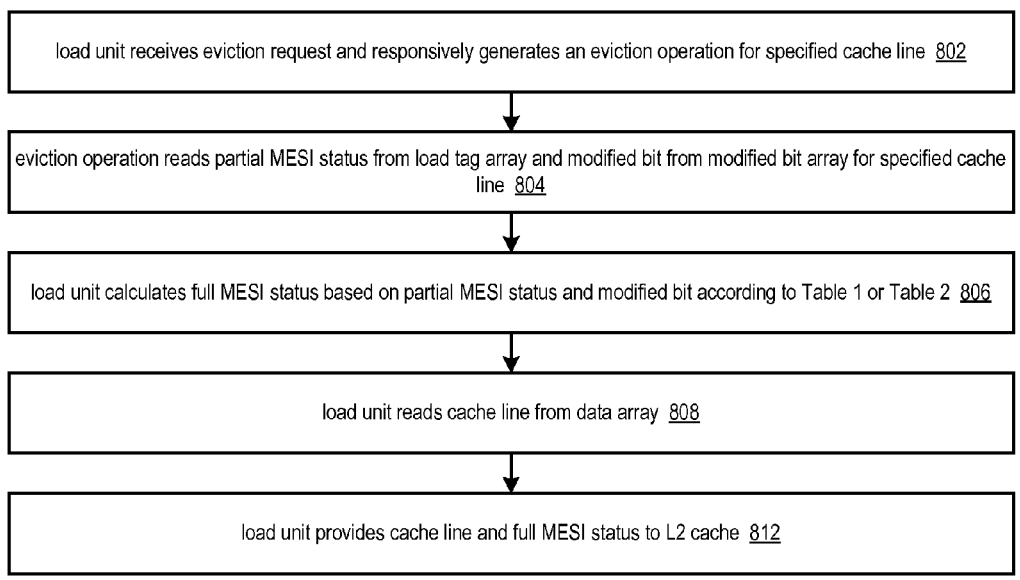
FIG. 8 is a flowchart illustrating operation of the microprocessor of FIG. 1 having the embodiment of the execution units and memory subsystem of FIG. 6 to execute an eviction request according to the present invention.

Referring now to FIG. 8, a flowchart illustrating operation of the microprocessor 100 of FIG. 1 having the embodiment of the execution units and memory subsystem 112 of FIG. 6 to execute an eviction request 242 according to the present invention is shown. Flow begins at block 802.

At block 802, the load unit 122 receives an eviction request 242. In response, the load unit 122 generates an eviction operation to the cache line implicated by the eviction address. Flow proceeds to block 804.

At block 804, the eviction operation reads the partial MESI status 632 from the load tag array 212 and reads the modified bit 634 from the modified bit array 216 of FIG. 6 for the corresponding cache line implicated by the eviction address. Flow proceeds to block 806.

At block 806, the combinatorial logic 208 of the load unit 122 calculates the full MESI status 636 of the cache line according to either Table 1 of FIG. 3*a* or Table 2 of FIG. 3*b*. Flow proceeds to block 808.

At block 808, the load unit 122 reads the cache line specified by the eviction address from the data array 218. Flow proceeds to block 812.

At block 812, the load unit 122 provides the full MESI status calculated at block 806 and the cache line read at block 808 to the L2 cache 132 of FIG. 1 to perform the eviction. Flow ends at block 812.

Figure 9:
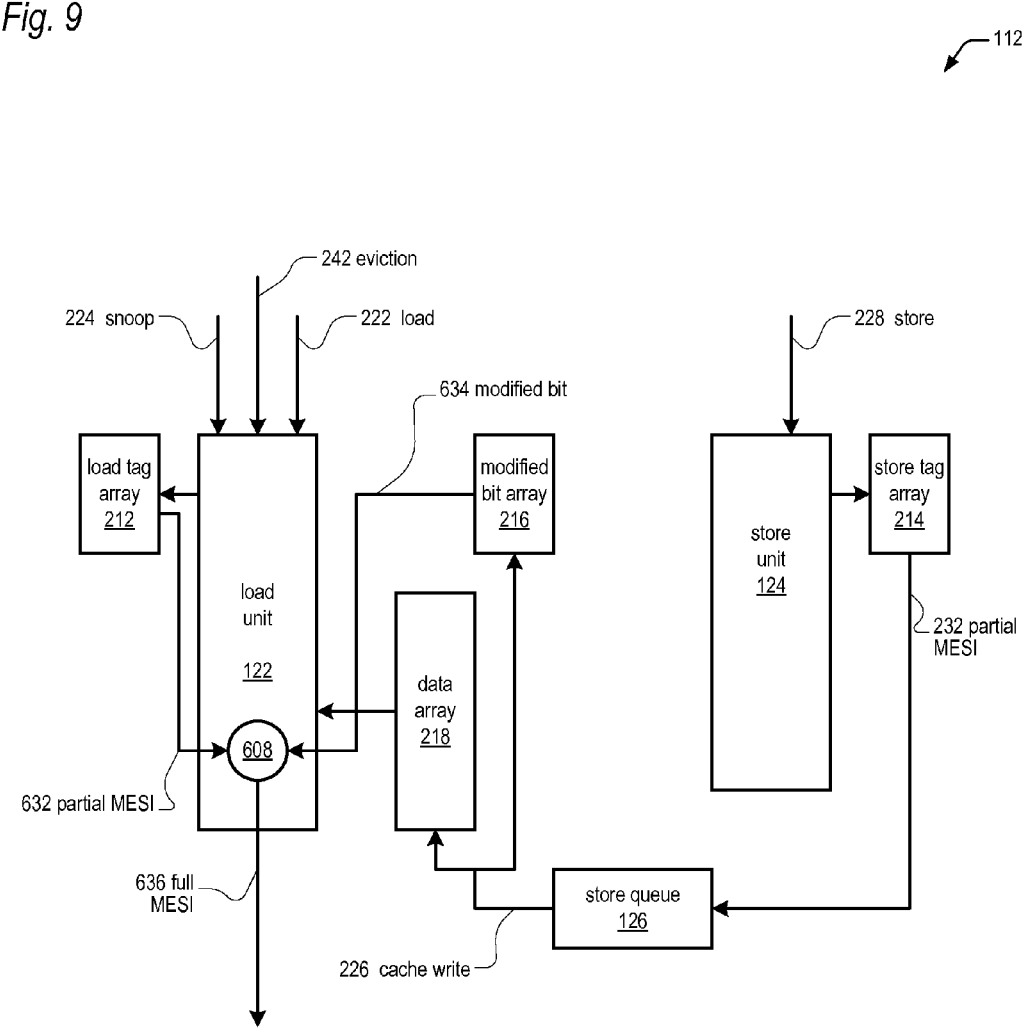
FIG. 9 is a block diagram illustrating a portion of the execution units and memory subsystem of the microprocessor of FIG. 1 according to an alternate embodiment of the present invention.

Referring now to FIG. 9, a block diagram illustrating a portion of the execution units and memory subsystem 112 of the microprocessor 100 of FIG. 1 according to an alternate embodiment of the present invention is shown. The embodiment of FIG. 9 is similar to the embodiment of FIG. 6 in many ways and like-numbered elements are similar. Differences are now described.

In the embodiment of FIG. 9, the modified bit array 216 includes only a single read port, rather than two read ports as in FIG. 6. Thus, the store unit 124 does not include the combinatorial logic 208 and does not generate the full MESI state 236. Instead, the store tag array 214 provides the partial MESI state 232 directly to the store queue 126. Consequently, the data cache 128 of FIG. 9 performs store requests 228 differently, as described below with respect to FIG. 10. Finally, the load unit 122 receives snoop requests 224, rather than the store unit 124. Consequently, the data cache 128 of FIG. 9 performs snoop requests 224 differently, as described below with respect to FIG. 11. In the embodiment of FIG. 9, the modified bit array 216 need not include the second read port for providing the modified bit to the store unit 124 since snoop queries are handled by the load unit 122, and the store unit 124 does not perform the optimization in FIG. 10 that is performed at decision block 418 of FIGS. 4 and 7 and therefore does not need to know the full MESI status of the cache line, but instead only needs to know whether the MESI status is at least Exclusive (at block 1012 of FIG. 10), which it may determine from the partial MESI status 232 from the store tag array 214.

Figure 10:
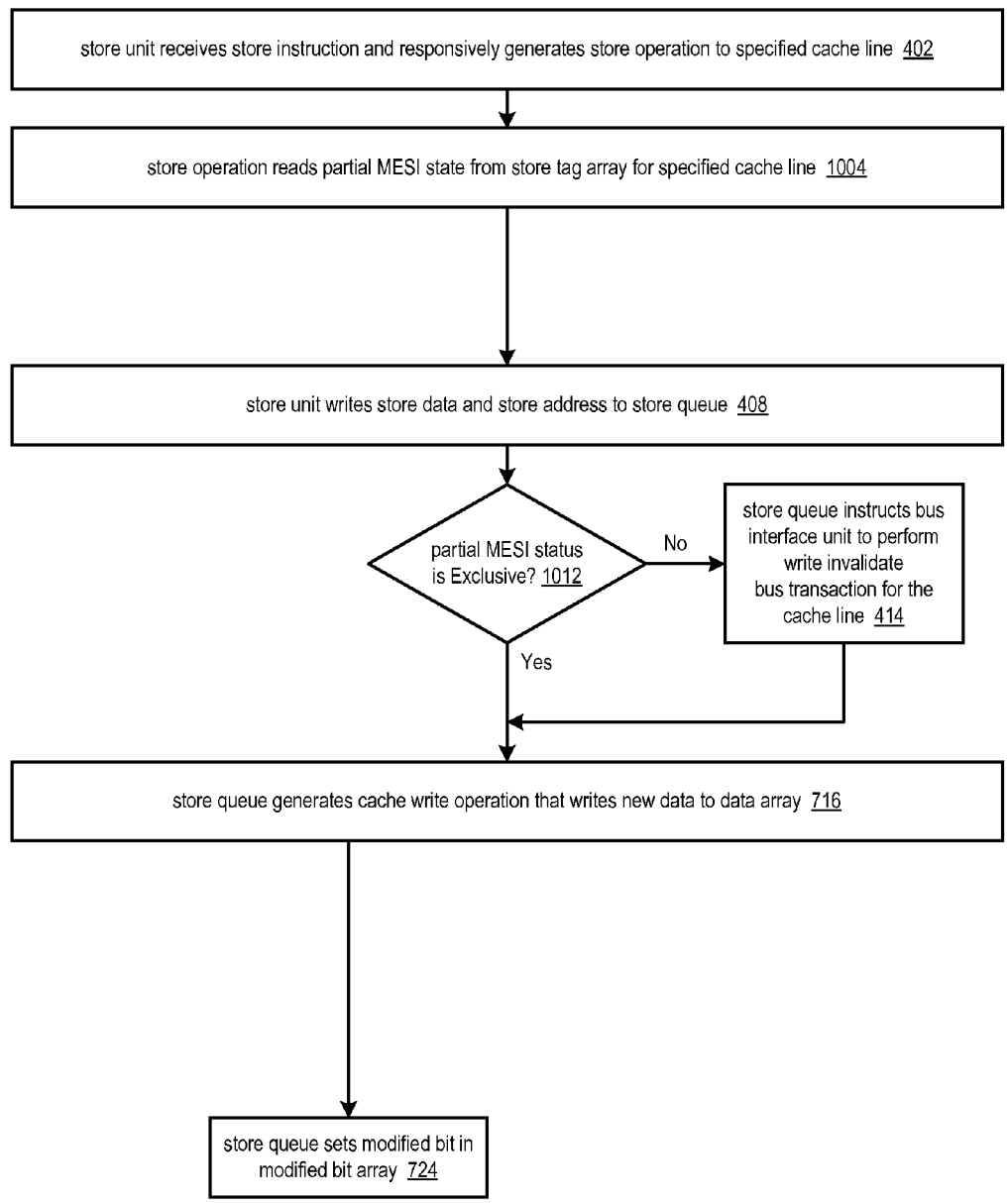
FIG. 10 is a flowchart illustrating operation of the microprocessor of FIG. 1 having the embodiment of the execution units and memory subsystem of FIG. 9 to execute a store instruction according to the present invention.

Referring now to FIG. 10, a flowchart illustrating operation of the microprocessor 100 of FIG. 1 having the embodiment of the execution units and memory subsystem 112 of FIG. 9 to execute a store instruction according to the present invention is shown. The flowchart of FIG. 10 is similar to the flowchart of FIG. 7. However, block 404 of FIG. 7 is replaced with block 1004 in FIG. 10 in which the reads only the partial MESI status 232 from the store tag array 214, but does not read the modified bit 234 from the modified bit array 216 as in block 404 of FIG. 7. Additionally, block 406 is absent from FIG. 10 and flow proceeds directly from block 1004 to block 408. Still further, decision block 412 of FIG. 7 is replaced by decision block 1012 in FIG. 10 in which the store queue 126 determines whether the partial MESI status 232 received at block 1004 is at least Exclusive (rather than determining whether the full MESI status 236 calculated at block 406 is either Exclusive or Modified as in decision block 412 of FIG. 7). Finally, the flowchart of FIG. 10 does not include decision block 418 of FIG. 7 since the store queue 126 does not have access to the full MESI status of the cache line and therefore cannot make the optimization as in FIG. 7; rather, flow proceeds directly from block 716 to block 724.

Figure 11:
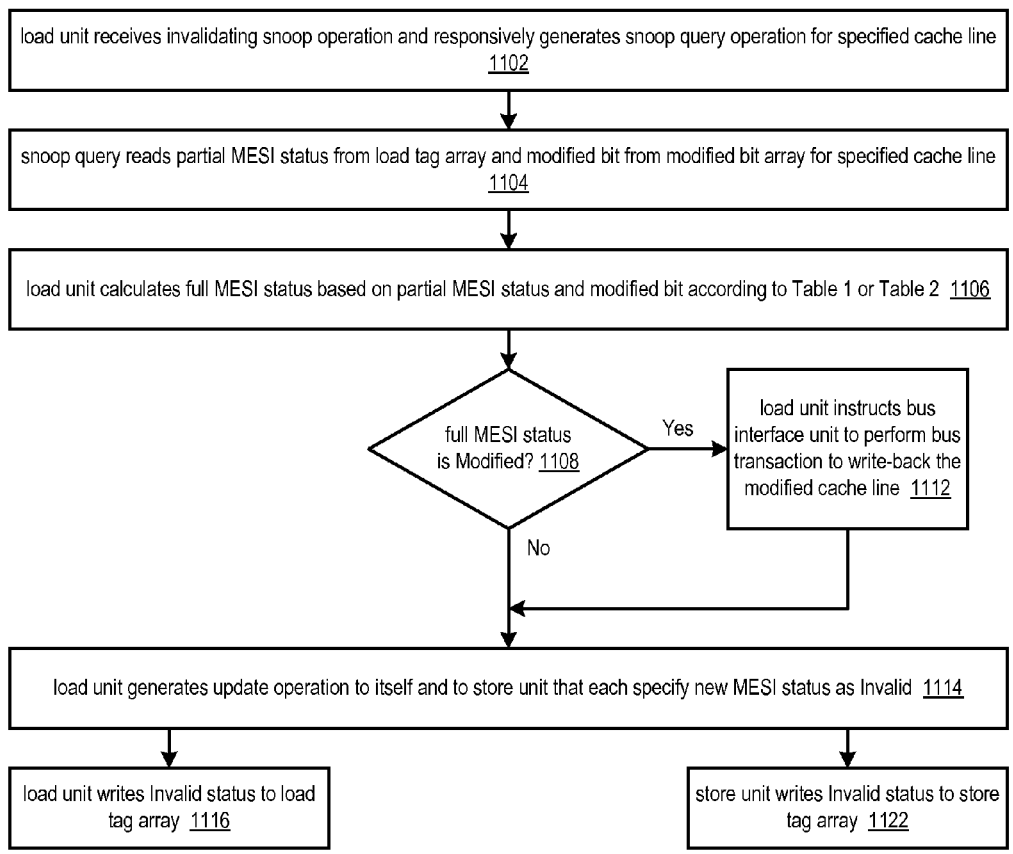
FIG. 11 is a flowchart illustrating operation of the microprocessor of FIG. 1 having the embodiment of the execution units and memory subsystem of FIG. 9 to execute an invalidating snoop request according to the present invention.

Referring now to FIG. 11, a flowchart illustrating operation of the microprocessor 100 of FIG. 1 having the embodiment of the execution units and memory subsystem 112 of FIG. 9 to execute an invalidating snoop request according to the present invention is shown. Flow begins at block 1102.

At block 1102, the load unit 122 receives an invalidating snoop request 224. In response, the load unit 122 generates a snoop query operation to itself to the cache line implicated by the snoop address. Flow proceeds to block 1104.

At block 1104, the snoop query operation reads the partial MESI status 632 from the load tag array 212 and reads the modified bit 634 from the modified bit array 216 of FIG. 9 for the corresponding cache line implicated by the snoop address. Flow proceeds to block 1106.

At block 1106, the combinatorial logic 608 of the load unit 122 calculates the full MESI status 636 of the cache line according to either Table 1 of FIG. 3a or Table 2 of FIG. 3b. Flow proceeds to decision block 1108.

At decision block 1108, the load unit 122 determines whether the full MESI status 636 calculated at block 1106 is Modified. If so, flow proceeds to block 1112; otherwise, flow proceeds to block 1114.

At block 1112, the load unit 122 instructs the bus interface unit 134 to perform a bus transaction to write back the modified cache line to system memory. Flow proceeds to block 1114.

At block 1114, the load unit 122 generates a status update operation to itself and a status update operation to the store unit 124 that each specify the new MESI status as Invalid. Flow proceeds concurrently to blocks 1116 and 1122.

At block 1116, the load unit 122 writes the Invalid status to the entry of the load tag array 212 corresponding to the cache line implicated by the snoop address. Flow ends at block 1116.

At block 1122, the store unit 124 writes the Invalid status to the entry of the store tag array 214 corresponding to the cache line implicated by the snoop address. Flow ends at block 1122.

It is noted that in the embodiment of FIG. 9, the modified bit in the modified bit array 216 is reset when the corresponding cache line is allocated, rather than resetting it in response to the snoop request 224 as in block 518 of FIG. 5.

Figure 12:
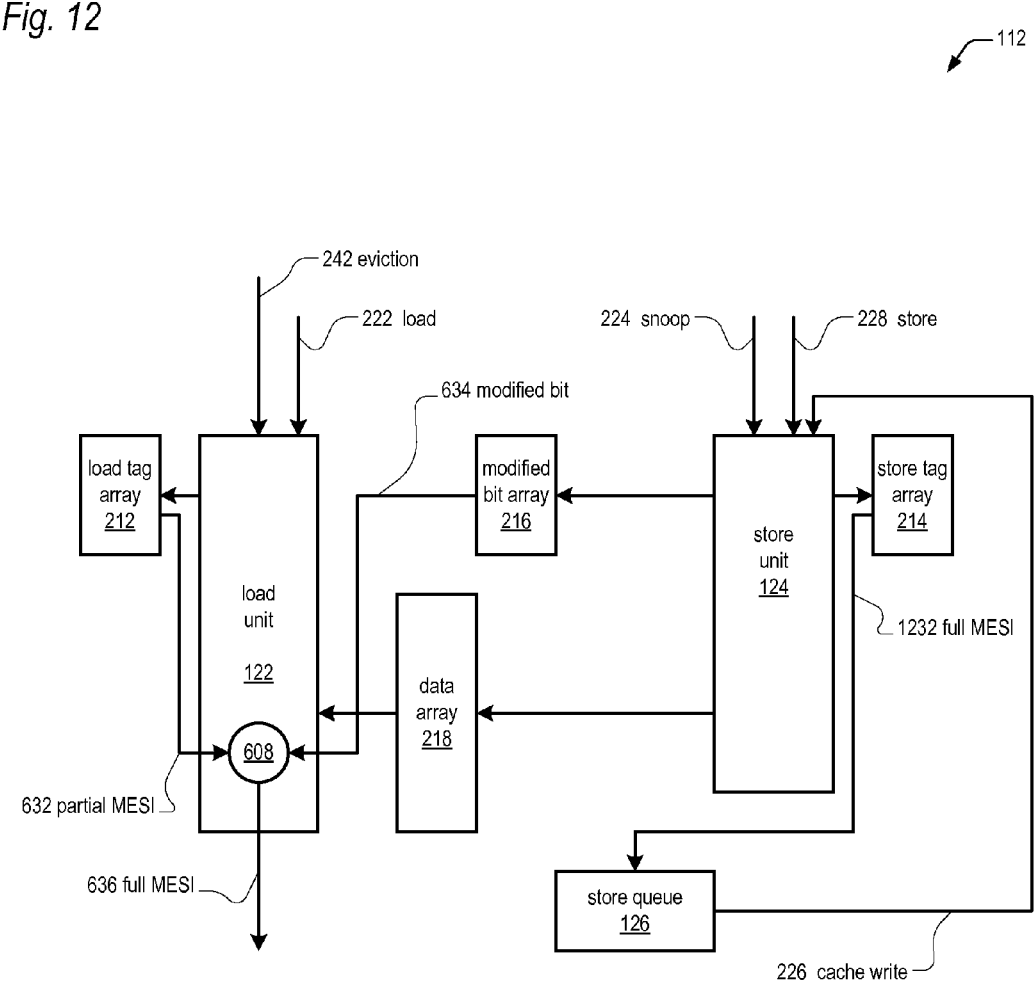
FIG. 12 is a block diagram illustrating a portion of the execution units and memory subsystem of the microprocessor of FIG. 1 according to an alternate embodiment of the present invention.

Referring now to FIG. 12, a block diagram illustrating a portion of the execution units and memory subsystem 112 of the microprocessor 100 of FIG. 1 according to an alternate embodiment of the present invention is shown. The embodiment of FIG. 12 is similar to the embodiment of FIG. 9 in many ways and like-numbered elements are similar. Differences are now described.

In the embodiment of FIG. 12, the store queue 126 generates the cache write operation 226 to the store unit 124 (rather than to the load unit 122 as in FIG. 2 or directly to the data array 218 and modified bit array 216 as in FIGS. 6 and 9). The write port of the data array 218 and the write port of the modified bit array 216 are coupled to the store unit 124 such that the store unit 124 (rather than the store queue 126 as in FIG. 9) writes the cache line into the data array 218 and updates the modified bits in the modified bit array 216 in response to the cache write operation 226 from the store queue 126. The store unit 124 updates the store tag array 214 with the full MESI status of the cache line which enables the store unit 124 to perform the optimization similar to that performed at decision block 418 of FIGS. 4 and 7 by the load unit 122 and store queue 126, respectively, and the store tag array 214 provides a full MESI status 1232 to the store queue 126.

Additionally, the store unit 124 receives snoop requests 224, rather than the load unit 122. Consequently, the store unit 124 of FIG. 12 performs snoop requests 224 in a manner similar to that described above with respect to FIG. 5, except that the store unit 124 receives the full MESI status 1232 directly from the store tag array 214 (rather than from the combinatorial logic 208 of FIG. 2). However, because the load unit 122 also provides full MESI status 636, an embodiment is contemplated in which the load unit 122 handles snoop requests 224 as described with respect to FIG. 11 above.

Finally, eviction requests 242 are handled by the load unit 122 similarly to the way in which they are handled as described with respect to FIG. 8 above.

Figure 13:
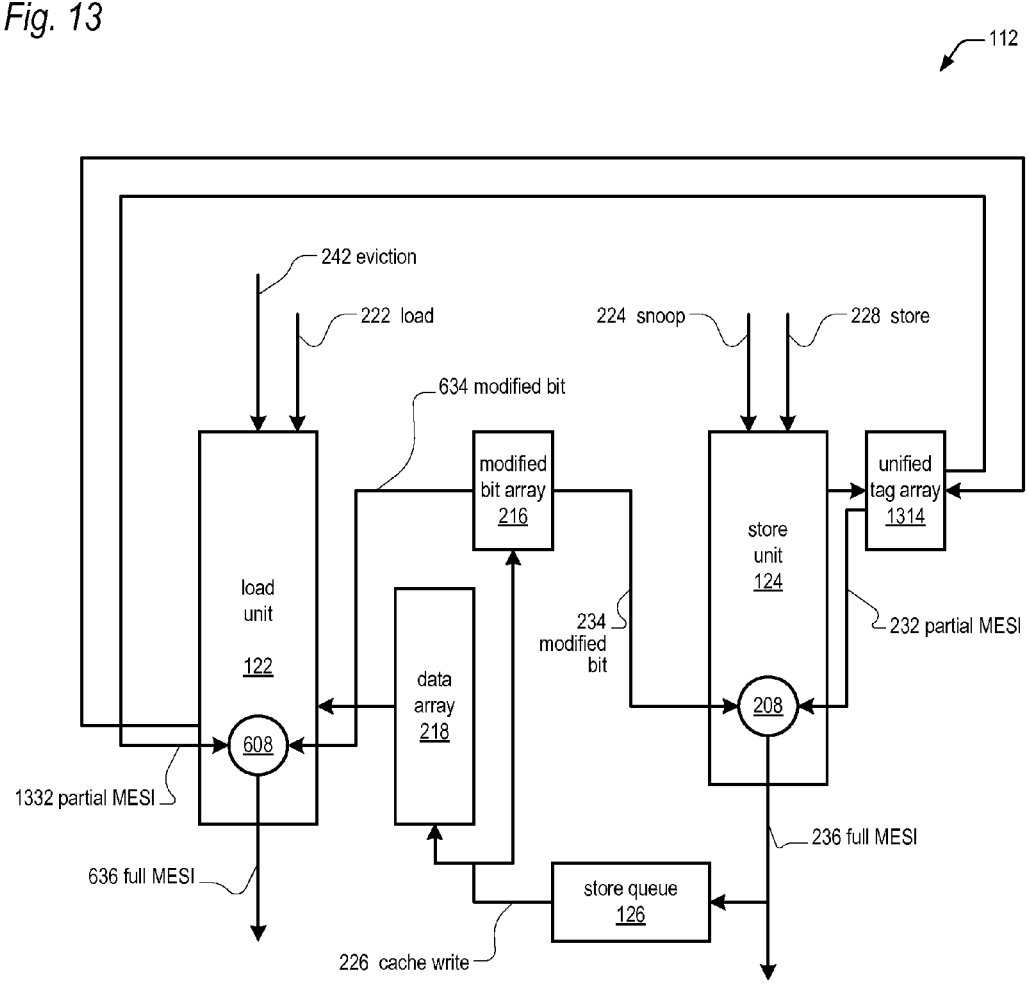
FIG. 13 is a block diagram illustrating a portion of the execution units and memory subsystem 112 of the microprocessor 100 of FIG. 1 according to an alternate embodiment of the present invention.

Referring now to FIG. 13, a block diagram illustrating a portion of the execution units and memory subsystem 112 of the microprocessor 100 of FIG. 1 according to an alternate embodiment of the present invention is shown. The embodiment of FIG. 13 is similar to the embodiment of FIG. 6 in many ways and like-numbered elements are similar. Differences are now described.

The embodiment of FIG. 13 includes a single dual-ported tag array 1314, also referred to as unified tag array 1314, rather than a load tag array 212 and a store tag array 214. That is, the unified tag array 1314 has a first read/write port coupled to the load unit 122 and a second read/write port coupled to the store unit 124. The first read/write port provides partial MESI status 232 to the combinatorial logic 208 of the store unit 124, and the second read/write port provides partial MESI status 1332 to the combinatorial logic 608 of the load unit 122. In the embodiment of FIG. 13, the data cache 128 does not update the unified tag array 1314 with the new status of Modified when the store queue 126 performs the cache write operation 226, which is advantageous because it reduces congestion to the unified tag array 1314. Nevertheless, the store unit 124 may calculate the full MESI status 236 of the cache line and the load unit 122 may calculate the full MESI status 1332 of the cache line by accessing both the unified tag array 1314 and the modified bit array 216.

An alternate embodiment of FIG. 13 is contemplated, similar to the embodiment of FIG. 9 described above, in which the load unit 122 handles snoop requests 224 and in which the store unit 124 does not perform the optimization at decision block 418, such that the store unit 124 does not generate the full MESI state 236 and the modified bit array 216 may have a single read port coupled to the load unit 122, rather than two read ports.

Although the embodiment of FIG. 13 does not enjoy the floor-planning and power management advantages of the embodiments with a separate load tag array 212 and a store tag array 214, the embodiment of FIG. 13 may still realize benefits provided by the modified bit array 216, namely reduced tag array congestion. Furthermore, the embodiment of FIG. 13 may be advantageous in an implementation in which space is at a premium and that includes an efficient dual-ported tag array design that is significantly smaller than the combined space consumed by two single-ported tag arrays.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A cache memory system, comprising:
   a first array of storage elements, each configured to store a cache line;
   a second array of storage elements corresponding to the first array of storage elements, each configured to store a first partial status of the cache line in the corresponding storage element of the first array; and
   a third array of storage elements corresponding to the first array of storage elements, each configured to store a second partial status of the cache line in the corresponding storage element of the first array, wherein the second partial status indicates whether or not the cache line has been modified;
   wherein when the cache memory system modifies the cache line within a storage element of the first array, the cache memory system writes only the second partial status in the corresponding storage element of the third array to indicate that the cache line has been modified but refrains from writing the first partial status in the corresponding storage element of the second array;
   wherein the cache memory system reads both the first partial status and the second partial status of the cache line from corresponding storage elements of the second array and the third array, respectively, to determine the full status of the cache line.

2. The cache memory system as recited in claim 1, wherein each of the storage elements of the second array is further configured to store an address tag of the cache line.

3. The cache memory system as recited in claim 2, wherein each of the storage elements of the third array is not configured to store an address tag of the cache line.

4. The cache memory system as recited in claim 1, wherein the first partial status indicates whether or not the cache line is valid.

5. The cache memory system as recited in claim 1, wherein the first partial status indicates whether the cache line is exclusively owned by the cache memory system.

6. The cache memory system as recited in claim 1, wherein the first partial status indicates whether the cache line is shared by the cache memory system with other cache memories.

7. The cache memory system as recited in claim 1, wherein when the cache memory system allocates the cache line within the first array, the cache memory system writes the first partial status in the second array with the full status of the cache line.

8. The cache memory system as recited in claim 7, wherein when the cache memory system allocates the cache line within the first array, the cache memory system also writes the second partial status in the third array to indicate that the cache line has not been modified.

9. The cache memory system as recited in claim 1, wherein when the cache memory system invalidates the cache line within the first array, the cache memory system writes the first partial status in the second array with the full status of the cache line.

10. The cache memory system as recited in claim 9, wherein when the cache memory system invalidates the cache line within the first array, the cache memory system also writes the second partial status in the third array to indicate that the cache line has not been modified.

11. The cache memory system as recited in claim 1, wherein the full status is one of the following four states: Modified, Exclusive, Shared, or Invalid (MESI).

12. The cache memory system as recited in claim 1, wherein when the second partial status that was read from the third array indicates the cache line has not been modified, the cache memory system determines that the full status of the cache line is the first partial status of the cache line that was read from the second array.

13. The cache memory system as recited in claim 1, wherein when the second partial status that was read from the third array indicates the cache line has been modified, the cache memory system determines that the full status of the cache line is modified, unless the first partial status of the cache line that was read from the second array indicates the cache line is invalid.

14. The cache memory system as recited in claim 1, wherein when the second partial status that was read from the third array indicates the cache line has been modified and the first partial status of the cache line that was read from the second array indicates the cache line is shared by the cache memory system with other cache memories, the cache memory system determines that the full status of the cache line is modified.

15. The cache memory system as recited in claim 1, wherein when the second partial status that was read from the third array indicates the cache line has been modified and the first partial status of the cache line that was read from the second array indicates the cache line is shared by the cache memory system with other cache memories, the cache memory system determines that the full status of the cache line is shared by the cache memory system with other cache memories.

16. The cache memory system as recited in claim 1, wherein when the second partial status that was read from the third array indicates the cache line has been modified and the first partial status of the cache line that was read from the second array indicates the cache line is exclusively owned by the cache memory system, the cache memory system determines that the full status of the cache line is modified.

17. The cache memory system as recited in claim 1, wherein each of the first, second and third arrays are organized having N sets and are configured to receive an index portion of a memory address that selects one of the N sets.

18. The cache memory system as recited in claim 17, wherein each of the N sets has M ways, wherein the third array is configured to output a vector specifying the second partial status of the cache line in each of the M ways of the first array, in response to the index.

19. The cache memory system as recited in claim 18, wherein the second partial status is a single bit that has a first predetermined Boolean value if the cache line has been modified and a second predetermined Boolean value if the cache line has not been modified.

20. A method for accessing a cache memory system, the method comprising:
storing a cache line in each storage element of a first array of storage elements;
storing into each storage element of a second array of storage elements corresponding to the first array of storage elements a first partial status of the cache line in the corresponding storage element of the first array;
storing into each storage element of a third array of storage elements corresponding to the first array of storage elements a second partial status of the cache line in the corresponding storage element of the first array, wherein the second partial status indicates whether or not the cache line has been modified;
in response to modifying the cache line within a storage element of the first array, writing only the second partial status in the corresponding storage element of the third array to indicate that the cache line has been modified, but refraining from writing the first partial status in the corresponding storage element of the second array;
determining the full status of the cache line by reading both the first partial status and the second partial status of the cache line from corresponding storage elements of the second array and the third array, respectively.

21. The method as recited in claim 20, wherein each of the storage elements of the second array is further configured to store an address tag of the cache line.

22. The method as recited in claim 21, wherein each of the storage elements of the third array is not configured to store an address tag of the cache line.

23. The method as recited in claim 20, wherein the first partial status indicates whether or not the cache line is valid.

24. The method as recited in claim 20, wherein the first partial status indicates whether the cache line is exclusively owned by the cache memory system.

25. The method as recited in claim 20, wherein the first partial status indicates whether the cache line is shared by the cache memory system with other cache memories.

26. The method as recited in claim 20, wherein when the cache memory system allocates the cache line within the first array, the cache memory system writes the first partial status in the second array with the full status of the cache line.

27. The method as recited in claim 7, wherein when the cache memory system allocates the cache line within the first array, the cache memory system also writes the second partial status in the third array to indicate that the cache line has not been modified.

28. The method as recited in claim 20, wherein when the cache memory system invalidates the cache line within the first array, the cache memory system writes the first partial status in the second array with the full status of the cache line.

29. The method as recited in claim 28, wherein when the cache memory system invalidates the cache line within the first array, the cache memory system also writes the second partial status in the third array to indicate that the cache line has not been modified.

30. The method as recited in claim 20, wherein the full status is one of the following four states: Modified, Exclusive, Shared, or Invalid (MESI).

31. The method as recited in claim 20, wherein when the second partial status that was read from the third array indicates the cache line has not been modified, the cache memory system determines that the full status of the cache line is the first partial status of the cache line that was read from the second array.

32. The method as recited in claim 20, wherein when the second partial status that was read from the third array indicates the cache line has been modified, the cache memory system determines that the full status of the cache line is modified, unless the first partial status of the cache line that was read from the second array indicates the cache line is invalid.

33. The method as recited in claim 20, wherein when the second partial status that was read from the third array indicates the cache line has been modified and the first partial status of the cache line that was read from the second array indicates the cache line is shared by the cache memory system with other cache memories, the cache memory system determines that the full status of the cache line is modified.

34. The method as recited in claim 20, wherein when the second partial status that was read from the third array indicates the cache line has been modified and the first partial status of the cache line that was read from the second array indicates the cache line is shared by the cache memory system with other cache memories, the cache memory system determines that the full status of the cache line is shared by the cache memory system with other cache memories.

35. The method as recited in claim 20, wherein when the second partial status that was read from the third array indicates the cache line has been modified and the first partial status of the cache line that was read from the second array indicates the cache line is exclusively owned by the cache memory system, the cache memory system determines that the full status of the cache line is modified.

36. The method as recited in claim 20, wherein each of the first, second and third arrays are organized having N sets and are configured to receive an index portion of a memory address that selects one of the N sets.

37. The method as recited in claim 36, wherein each of the N sets has M ways, wherein the third array is configured to output a vector specifying the second partial status of the cache line in each of the M ways of the first array, in response to the index.

38. The method as recited in claim 37, wherein the second partial status is a single bit that has a first predetermined Boolean value if the cache line has been modified and a second predetermined Boolean value if the cache line has not been modified.

39. A computer program product for use with a computing device, the computer program product comprising:
   a computer usable storage medium, having computer readable program code embodied in said medium, for specifying cache memory system, the computer readable program code comprising:
      first program code for specifying a first array of storage elements, each configured to store a cache line;
      second program code for specifying a second array of storage elements corresponding to the first array of storage elements, each configured to store a first partial status of the cache line in the corresponding storage element of the first array; and
      third program code for specifying a third array of storage elements corresponding to the first array of storage elements, each configured to store a second partial status of the cache line in the corresponding storage element of the first array, wherein the second partial status indicates whether or not the cache line has been modified;
   wherein when the cache memory system modifies the cache line within a storage element of the first array, the cache memory system writes only the second partial status in the corresponding storage element of the third array to indicate that the cache line has been modified but refrains from writing the first partial status in the corresponding storage element of the second array;
   wherein the cache memory system reads both the first partial status and the second partial status of the cache line from corresponding storage elements of the second array and the third array, respectively, to determine the full status of the cache line.

* * * * *